United States Patent [19]
Lin

[11] Patent Number: 5,744,177
[45] Date of Patent: Apr. 28, 1998

[54] INJECTION MOLDING ASSEMBLY

[76] Inventor: Rong-Teng Lin, 58, Ma Yuan West St., Taichung, Taiwan

[21] Appl. No.: 661,866

[22] Filed: Jun. 11, 1996

[51] Int. Cl.$^6$ ............................................. B29C 45/66
[52] U.S. Cl. ................................. 425/589; 425/595
[58] Field of Search ................................ 425/589, 595

[56] References Cited

U.S. PATENT DOCUMENTS

| | | | |
|---|---|---|---|
| 5,192,557 | 3/1993 | Hirata et al. | 425/589 |
| 5,320,517 | 6/1994 | Hirata et al. | 425/589 |
| 5,565,224 | 10/1996 | Stillhard | 425/589 |

*Primary Examiner*—Tim Heitbrink

[57] ABSTRACT

An injection molding assembly comprises a platform, two slide seats disposed on two upper sides of the platform, a hollow fixed plate and an injection device disposed on the platform. A movable plate is disposed on the slide seats longitudinally. A barrel of the injection device is inserted in an interior of the hollow fixed plate. A nozzle is disposed in front of the barrel. The nozzle passes through the hollow fixed plate to reach a mold. Four clamping devices are disposed on four corners of the locking device to connect four support rods which pass through the locking device, the movable plate and the hollow fixed plate. A mold support device is disposed on a center of the movable plate. The locking device has two parallel locking plates connected the movable plate. Each adjusting device has a cushion ring and a hollow nut passed through by the corresponding support rod.

1 Claim, 9 Drawing Sheets

INJECTION MOLDING ASSEMBLY

BACKGROUND OF THE INVENTION

The invention relates to an injection molding assembly. More particularly, the invention relates to an injection molding assembly which is easily assembled.

Referring to FIG. 9, a conventional injection molding device comprises a platform A1, two slide seats A2 on two upper sides of the platform A1, and an injection device A3 on the platform A1. An adjusting plate A5, a movable plate A6 and a fixed plate A7 are disposed on the slide seats A2 longitudinally. A mold support device A8 is disposed on the movable plate A6 transversely. A locking device A0 is disposed on the adjusting plate A5. A driving device A4 connects the adjusting plate A5 and the movable plate A6 transversely. The locking device A0 will drive the driving device A4 to move toward the fixed plate A7. The movable plate A6 which connects a mold therein will move toward the fixed plate A7 also. Thus the mold is closed. Further, the locking device A0 will drive the driving device A4 to move away from the fixed plate A7. The movable plate A6 which connects a mold therein will move away from the fixed plate A7 also. Thus the mold is opened. Since the locking device A0 is disposed on the adjusting plate A5 transversely, the locking device A0 protrudes over the platform A1. Thus the overall length of the conventional injection molding device is too long.

SUMMARY OF THE INVENTION

An object of the invention is to provide an injection molding assembly which has a short overall length.

Another object of the invention is to provide an injection molding assembly which is easily assembled.

Accordingly, an injection molding assembly comprises a platform, two slide seats disposed on two upper sides of the platform, a hollow fixed plate and an injection device disposed on the platform. A movable plate is disposed on the slide seats longitudinally. A taper hole and a through hole are formed in a center of the fixed plate. The taper hole communicates with the through hole. A barrel of the injection device is inserted in the taper hole. A nozzle is disposed in front of the barrel. The nozzle passes through the through hole to reach a mold. A first, second, third and fourth clamping devices are disposed on four corners of the locking device to connect a first, second, third and fourth support rods, respectively. The first, second, third and fourth support rods pass through the locking device, the movable plate and the hollow fixed plate. The hollow fixed plate has a protruded lateral plate. A mold support device is disposed on a center of the movable plate. The locking device has a first and second parallel locking plates connecting the movable plate. A first, second, third and fourth adjusting devices are disposed on a right upper corner, left upper corner, left lower corner, and right lower corner of the fixed plate. Each support rod has a threaded front section. Each of the first, second, third and fourth adjusting devices has a cushion ring and a hollow nut passed through by each corresponding threaded front section. The hollow nut is enclosed by a follower gear which engages with a driving gear. The follower gear drives the threaded front section to move rearward and forward. A bearing is disposed between the hollow nut and an adjusting plate. Two positioning bolts fasten the adjusting plate on the hollow fixed plate. A driving device has the driving gear disposed on the hollow fixed plate, a motor connected to the protruded lateral plate by four screws, a shaft bearing disposed in a center of the motor, a driving pinion disposed on the hollow fixed plate, the driving pinion engaged with a follower pinion, a shaft passing through a center of the shaft bearing and connecting an axle of the driving pinion, and an oil motor connecting the shaft. Each of the first, second, third and fourth clamping devices has a first clamp half nut and a second clamp half nut facing the first clamp half nut. A left and right lateral positioning seats are disposed adjacent to the corresponding clamp half nuts, respectively. An upper slide rod passes through the left lateral positioning seat, an upper left block, an upper right block, and the right lateral positioning seat. A lower slide rod passes through the left lateral positioning seat, a lower left block, a lower right block, and the right lateral positioning seat. A bottom bolt connects a rear end of the corresponding support rod. An inserting block is disposed on the bottom bolt abutting a positioning board which extends from the first clamp half nut. A positioning mount is disposed on the positioning board. A positioning mounting is disposed on the second clamp half nut. A second oil cylinder has a first lid connecting the positioning mounting, a second lid connecting a second cover of the mold support device, a first piston rod disposed in the second oil cylinder, and a piston ring connecting an inner end of the first piston rod. A first oil hole is formed on the first lid. The first piston rod passes through the positioning mount and the first lid. The first and fourth clamping devices are disposed on an upper and lower ends of the first locking plate, respectively. The second and third clamping devices are disposed on an upper and lower ends of the second locking plate, respectively. Each of the first and second locking plates is passed through by a locking piston rod. Each locking piston rod connects a locking piston which is inserted in an interior of the movable plate. A hollow disk covers an opening of the interior of the movable plate. A second oil hole is formed in the hollow disk. A hollow cushion abuts the hollow disk. The mold support device has a third oil cylinder which has the second cover, the first cover, an annular ring disposed in the third oil cylinder, a bottom plate abutting the first cover, and a second piston rod connecting the annular ring and passing through the first cover and the bottom plate to connect a pivot of the mold. A mold support plate and the bottom plate are connected by a plurality of slide plates. A bush is disposed between the mold support plate and the slide plates. An enlarged hole is formed in the movable plate to receive the mold support plate. Each oil motor is actuated to drive each corresponding shaft and each corresponding driving pinion to rotate. Each corresponding driving pinion drives each corresponding driving gear to rotate. Each corresponding driving gear drives each corresponding follower gear and each corresponding hollow nut to rotate and to move each corresponding support rod rearward and forward.

DETAILED DESCRIPTION OF THE INVENTION

Figure 1:
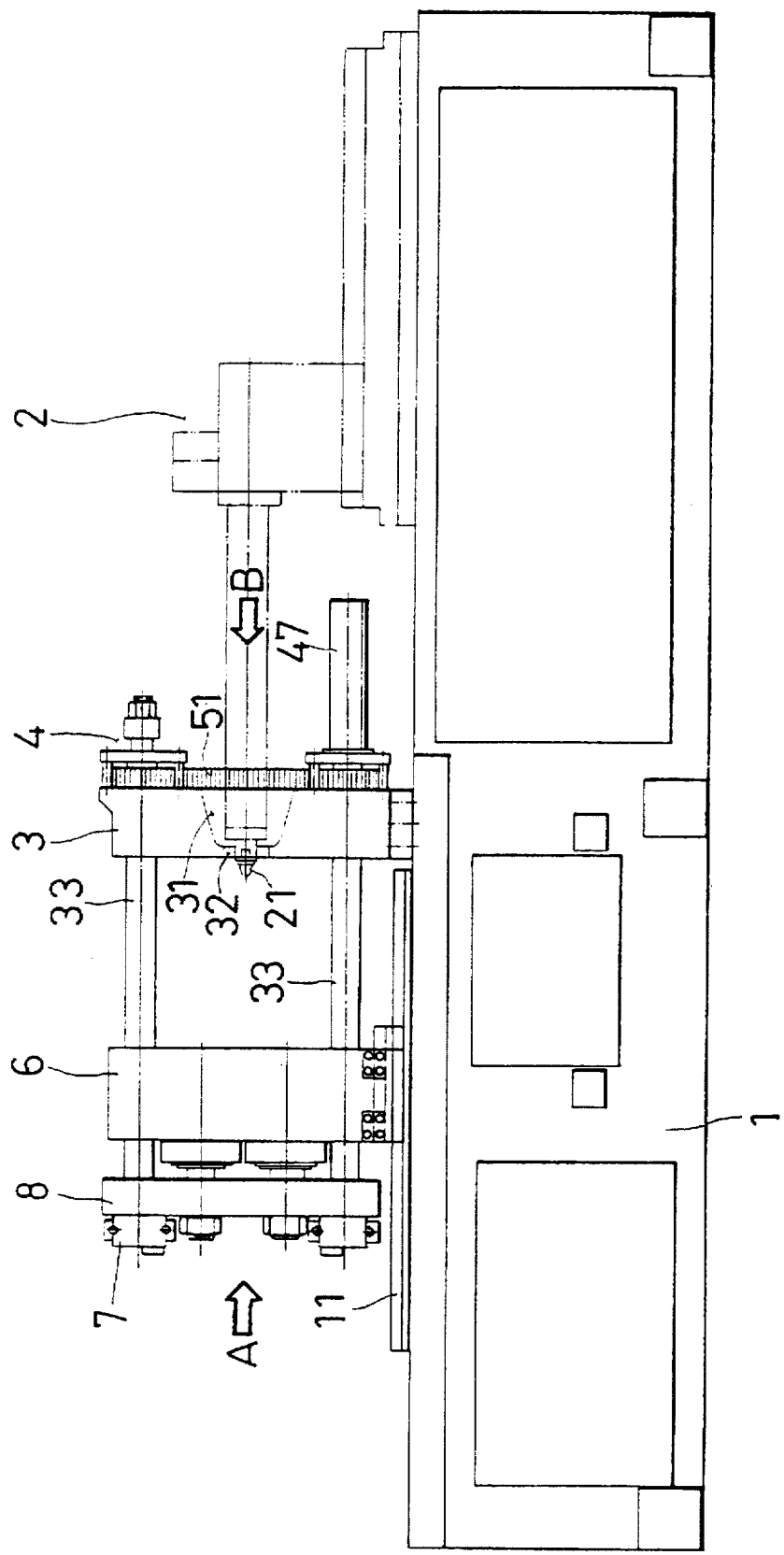
FIG. 1 is a side elevational view of an injection molding assembly of a preferred embodiment in accordance with the invention.
Figure 2:
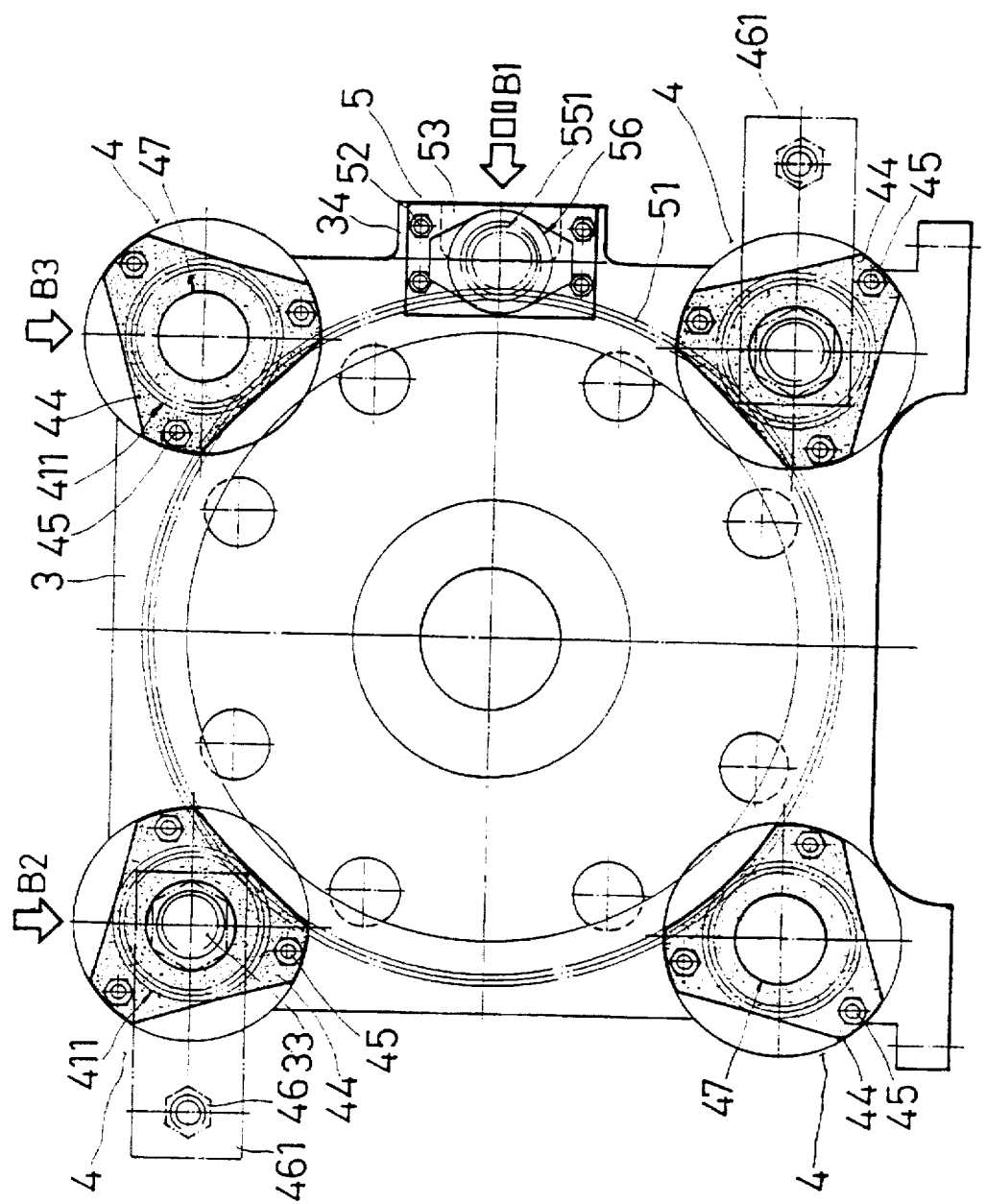
FIG. 2 is a rear elevational view of a fixed plate and four adjusting devices.

Referring to FIGS. 1 to 6, an injection molding assembly comprises a platform 1, two slide seats 11 disposed on two upper sides of the platform 1, a hollow fixed plate 3 and an injection device 2 disposed on the platform 1. A movable plate 6 is disposed on the slide seats 11 longitudinally. A taper hole 31 and a through hole 32 are formed in a center of the fixed plate 3. The taper hole 31 communicates with the through hole 32. A barrel of the injection device 2 is inserted in the taper hole 31. A nozzle 21 is disposed in front of the barrel. The nozzle 21 passes through the through hole 32 to reach a mold (not shown in the figures). A first, second, third and fourth clamping devices 7 are disposed on four corners of the locking device 8 to connect a first, second, third and fourth support rods 33. The first, second, third and fourth support rods 33 pass through the locking device 8, the movable plate 6 and the hollow fixed plate 3. The hollow fixed plate 3 has a protruded lateral plate 34. A mold support device 9 is disposed on a center of the movable plate 6. The locking device 8 has a first and second parallel locking plates 81 connecting the movable plate 6. A first, second, third and fourth adjusting devices 4 are disposed on a right upper corner, left upper corner, left lower corner, and right lower corner of the fixed plate 3 (as shown in FIG. 2). Each of the support rods 33 has a threaded end section 330 and a threaded front section 331.

Figure 4:
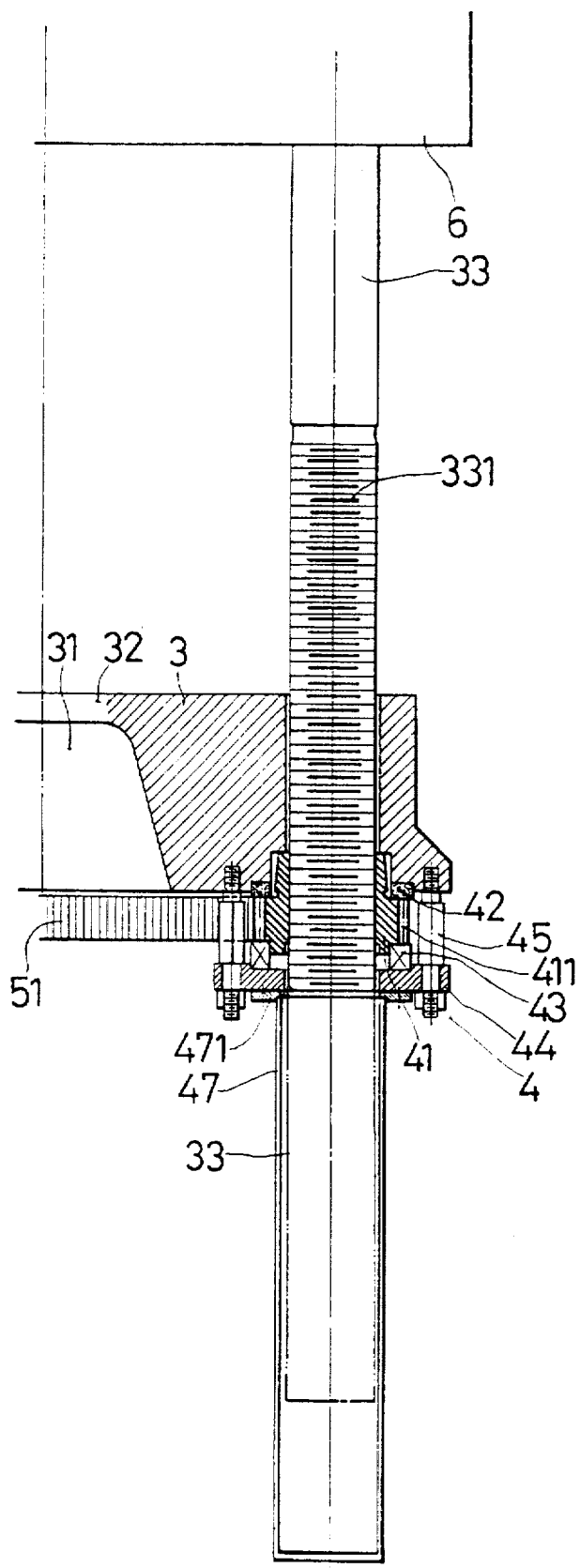
FIG. 4 is a partially sectional view of a hollow pipe connecting an adjusting device.

Referring to FIGS. 2 and 4, each of the first and third adjusting devices 4 has a cushion ring 42 and a hollow nut 41 passed through by the corresponding threaded front section 331. The hollow nut 41 is enclosed by a follower gear 411 which engages with a driving gear 51. The follower gear 411 drives the threaded front section 331 to move rearward and forward. A bearing 43 is disposed between the hollow nut 41 and an adjusting plate 44. Two positioning bolts 45 fasten the adjusting plate 44 on the hollow fixed plate 3. It is an option to provide a hollow pipe 47 with a pipe flange 471 abuts the adjusting plate 44. The threaded rear section 331 can be inserted in the hollow pipe 47.

Figure 3:
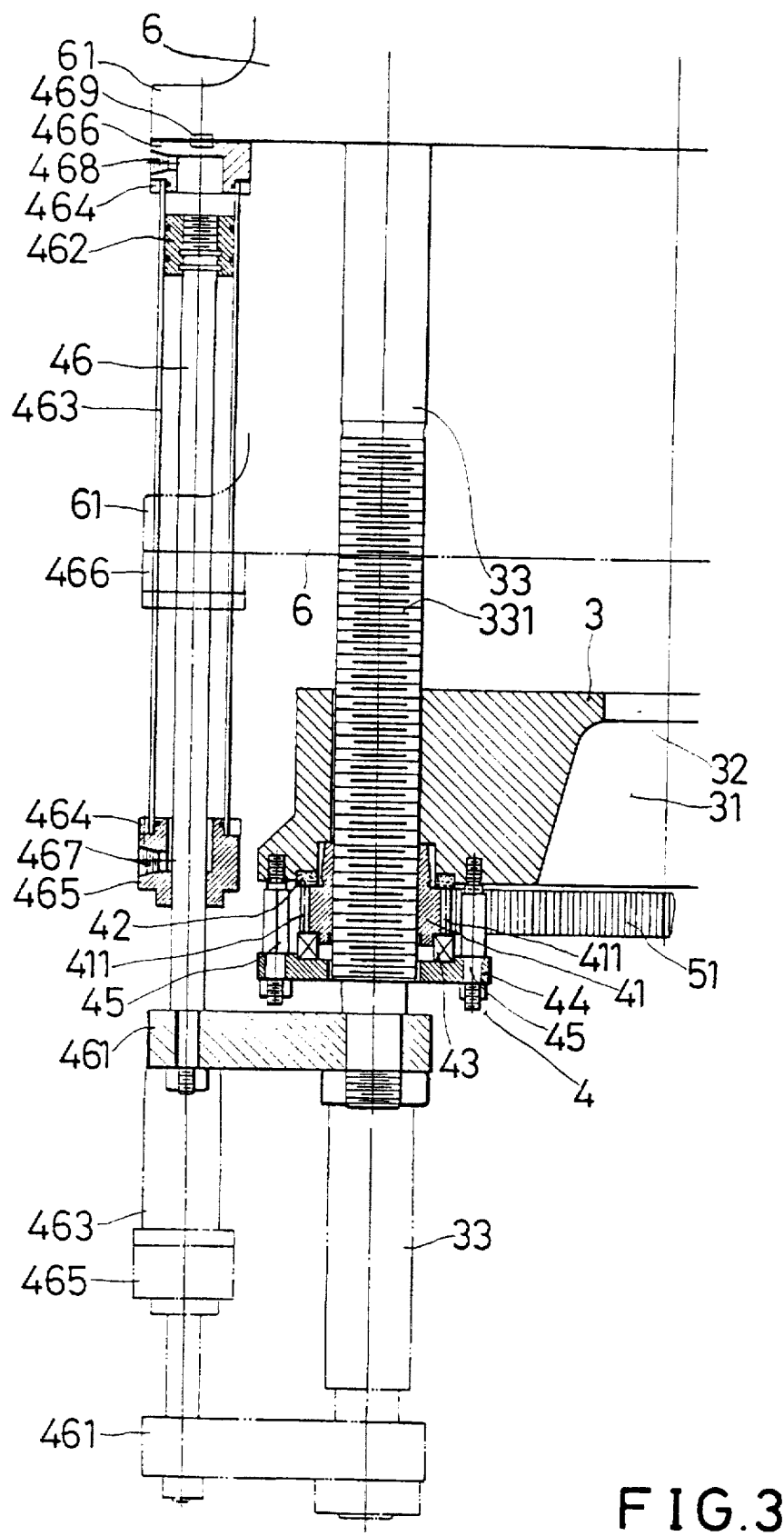
FIG. 3 is a partially sectional view of a fast cylinder connecting an adjusting device.

Referring to FIGS. 2 and 3, each of the second and fourth adjusting devices 4 has a cushion ring 42 and a hollow nut 41 passed through by the corresponding threaded front section 331. The hollow nut 41 is enclosed by a follower gear 411 which engages with a driving gear 51. A bearing 43 is disposed between the hollow nut 41 and an adjusting plate 44. Two positioning bolts 45 fasten the adjusting plate 44 on the hollow fixed plate 3. A connecting plate 461 connects the corresponding support rod 33 and a fast piston rod 46. The fast piston rod 46 is inserted in a fast cylinder 463 which has a cylinder piston 462 therein. The cylinder piston 462 is moved by one end of the fast piston rod 46. A first positioning ring 464 is positioned on a front end of the fast cylinder 463. A second positioning ring 464' is positioned on a rear end of the fast cylinder 463. A front cap 465 is disposed abutting a front of the first positioning ring 464. A rear cap 466 is disposed abutting a back of the second positioning ring 464'. A first hole 467 is formed in the front cap 465. A second hole 468 is formed in the rear cap 466. A positioning pin 469 fastens the rear cap 466 on an extending lateral plate 61 of the movable plate 6.

Figure 5:
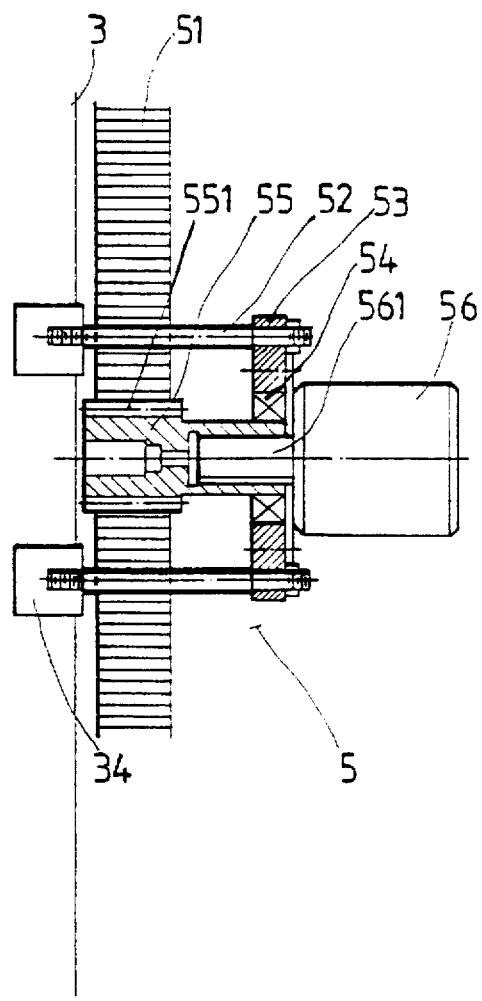
FIG. 5 is a partially sectional view of a driving device.

Referring to FIGS. 2 and 5, a driving device 5 has the driving gear 51 disposed on the hollow fixed plate 3, a motor 53 connected to the protruded lateral plate 34 by four screws 52, a shaft bearing 54 disposed in a center of the motor 53, a driving pinion 55 disposed on the hollow fixed plate 3, the driving pinion 55 engaged with a follower pinion 551, a shaft 561 passing through a center of the shaft bearing 54 and connecting an axle of the driving pinion 55, and an oil motor 56 connecting the shaft 561.

Figure 6:
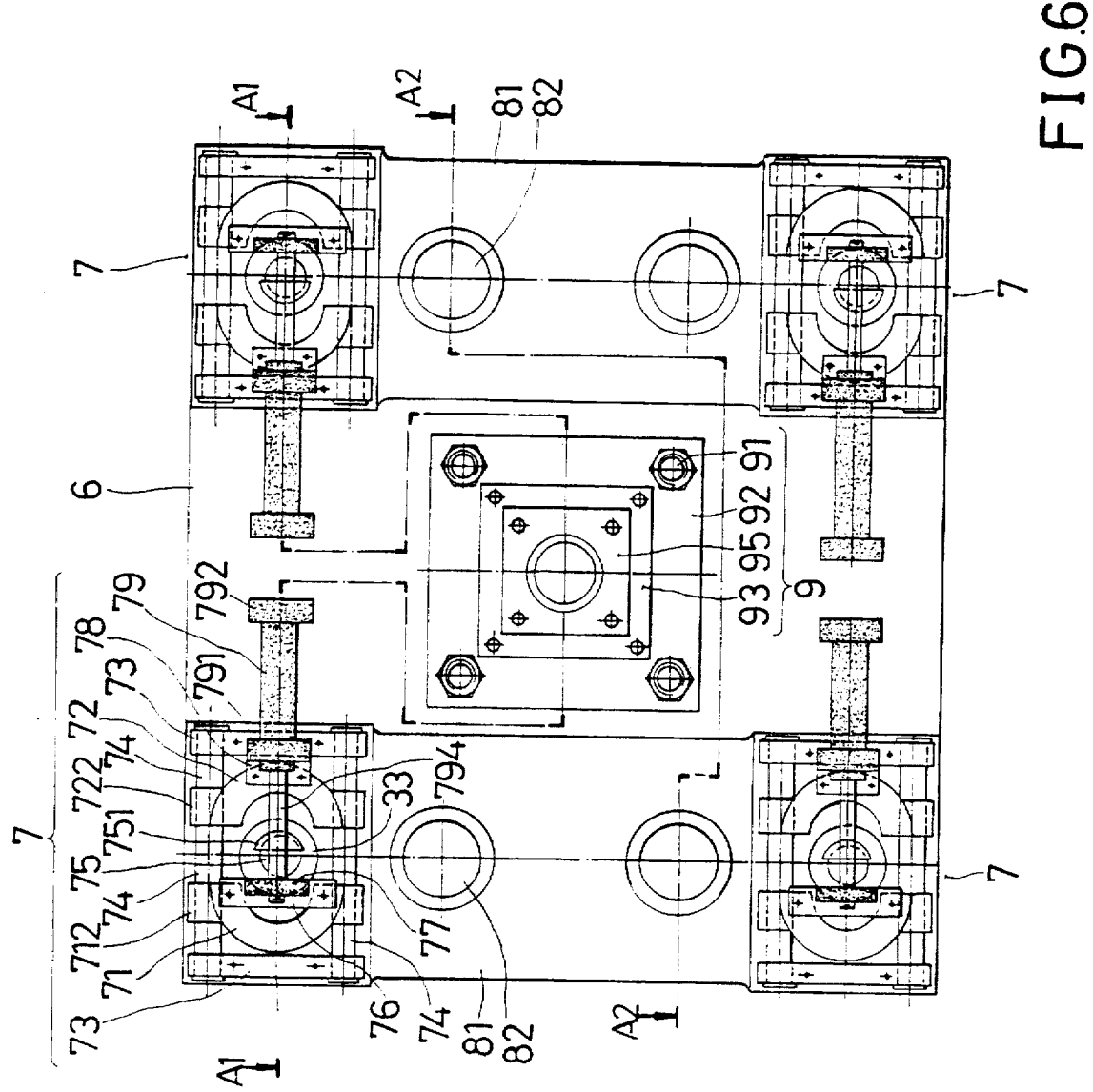
FIG. 6 is a front elevational view of a mold support device, four clamping devices and four locking devices.
Figure 7:
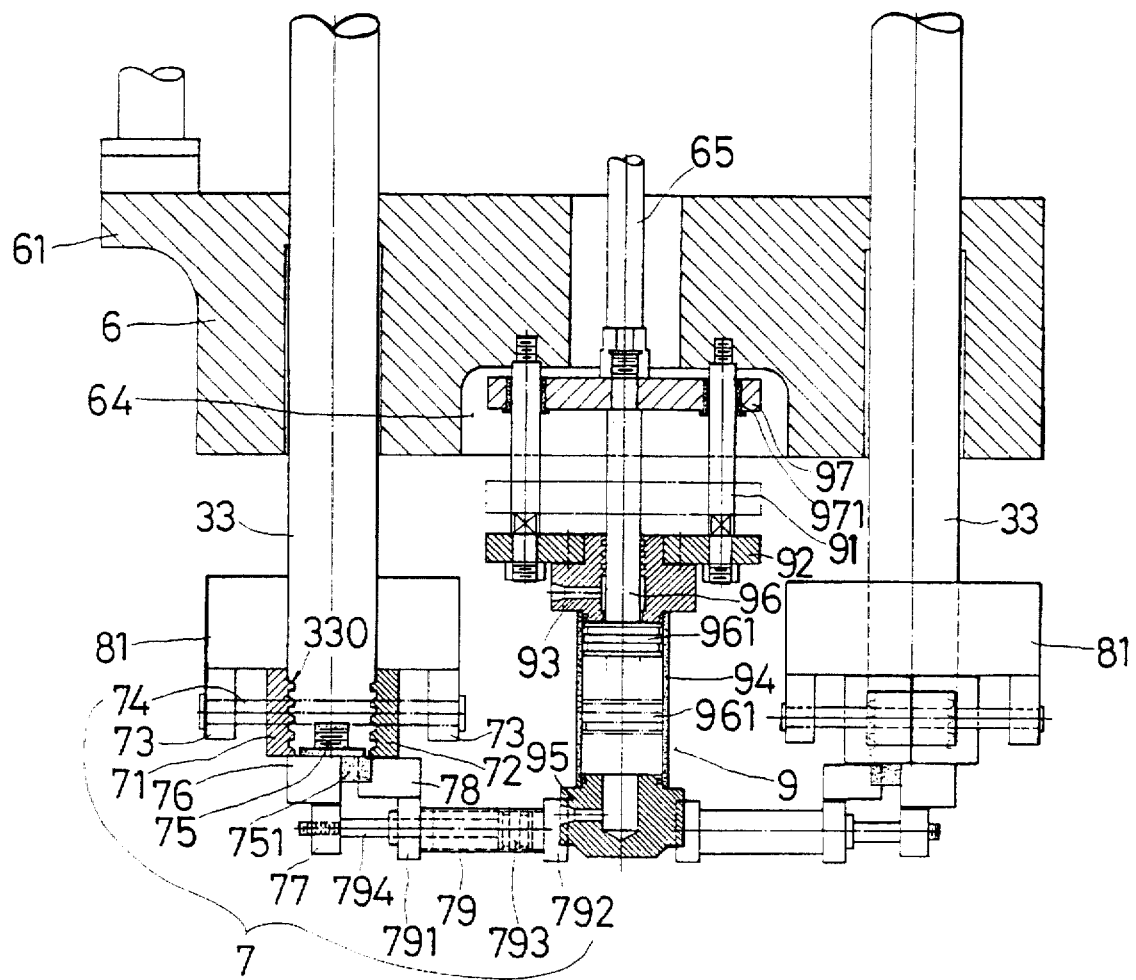
FIG. 7 is a sectional view of a mold support device and a clamping device.

Referring to FIGS. 1, 6 and 7, each of the first, second, third and fourth clamping devices 7 has a first clamp half nut 71 and a second clamp half nut 72 facing the first clamp half nut 71. A left and right lateral positioning seats 73 are disposed adjacent to the corresponding clamp half nuts 71 and 72, respectively. An upper slide rod 74 passes through the left lateral positioning seat 73, an upper left block 712, an upper right block 722, and the right lateral positioning seat 73. A lower slide rod 74 passes through the left lateral positioning seat 73, a lower left block 712, a lower right block 722, and the right lateral positioning seat 73. A bottom bolt 75 connects a rear end of the corresponding support rod 33. An inserting block 751 is disposed on the bottom bolt 75 abutting a positioning board 76 which extends from the first clamp half nut 71. A positioning mount 77 is disposed on the positioning board 76. A positioning mounting 78 is disposed on the second clamp half nut 72. A second oil cylinder 79 has a first lid 791 connecting the positioning mounting 78, a second lid. 792 connecting a second cover 95 of the mold support device 9, a first piston rod 794 disposed in the second oil cylinder 79, and a piston ring 793 connecting an inner end of the first piston rod 794. A first oil hole 790 is formed on the first lid 791. The first piston rod 794 passes through the positioning mount 77 and the first lid 791. The first and fourth clamping devices 7 are disposed on an upper and lower ends of the first locking plate 81. The second and third clamping devices 7 are disposed on an upper and lower ends of the second locking plate 81'.

Figure 8:
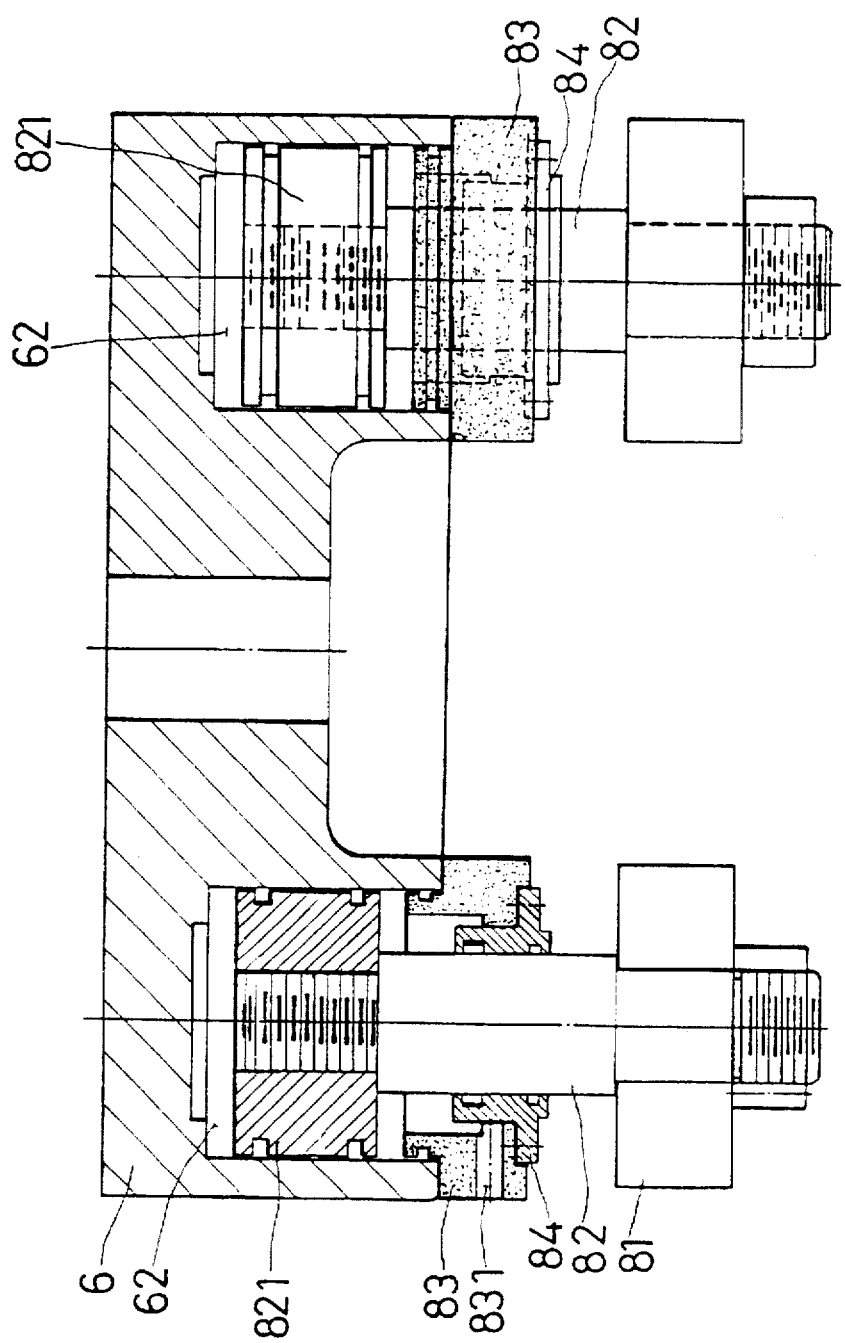
FIG. 8 is a sectional view of a locking device.
Figure 9:
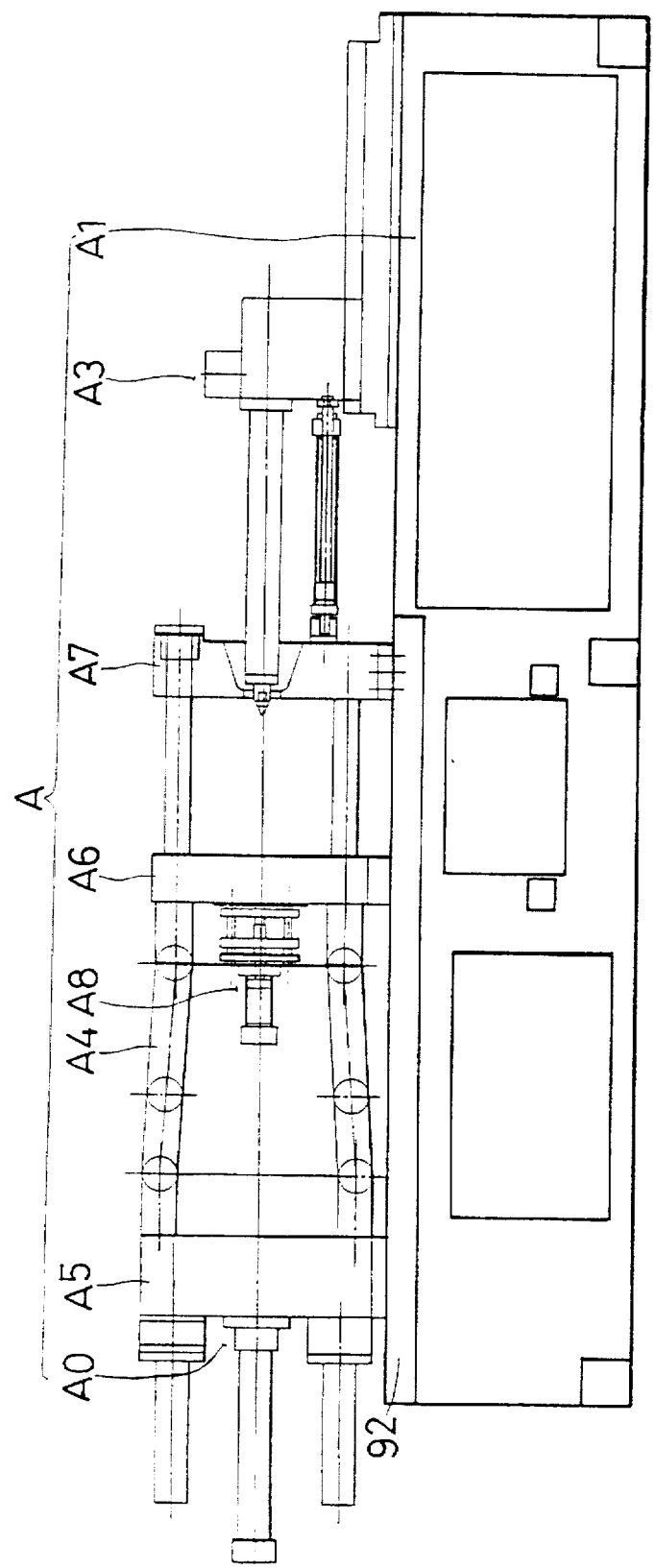
FIG. 9 is a side elevational view of a conventional injection molding device of the prior art.

Referring to FIGS. 1, 6 and 8, each of the first and second locking plates 81, 81' is passed through by a locking piston rod 82. Each locking piston rod 82 connects a locking piston 821 of an oil cylinder 62 which is inserted in an interior of the movable plate 6. A hollow disk 83 covers an opening of the interior of the movable plate 6. A second oil hole 831 is formed in the hollow disk 83. A hollow cushion 84 abuts the hollow disk 83.

Referring to FIGS. 6 and 7, the mold support device 9 has a third oil cylinder 94 which has the second cover 95, the first cover 93, an annular ring 961 disposed in the third oil cylinder 94, a bottom plate 92 abutting the first cover 93, and a second piston rod 96 connecting the annular ring 961 and passing through the first cover 93 and the bottom plate 92 to connect a pivot 65 of a mold (not shown in the figures). A mold support plate 97 and the bottom plate 92 are connected by a plurality of slide plates 91. A bush 971 is disposed between the mold support plate 97 and the slide plates 91. An enlarged hole 64 is formed in the movable plate 6 to receive the mold support plate 97.

Referring to FIGS. 1 to 8 again, the oil motor 56 is actuated to drive the shaft 561 and the driving pinion 55 to rotate. The driving pinion 55 drives the driving gear 51 to rotate. The driving gear 51 drives the follower gear 411 and the hollow nut 41 to rotate. Thus the corresponding support rod 33 is moved.

The invention is not limited to the above embodiment but various modification thereof may be made. Further, various changes in form and detail may be made without departing from the scope of the invention.

I claim:
1. An injection molding assembly comprises:

a platform, two slide seats disposed on two upper sides of the platform, a hollow fixed plate and an injection device disposed on the platform, a movable plate disposed on the slide seats longitudinally;

a taper hole and a through hole formed in a center of the fixed plate, the taper hole communicating with the through hole, a barrel of the injection device inserted in the taper hole, a nozzle disposed in front of the barrel, the nozzle passing through the through hole to reach a mold, a first, second, third and fourth clamping devices disposed on four corners of the locking device to connect a first, second, third and fourth support rods, respectively, the first, second, third and fourth support rods passing through the locking device, the movable plate and the hollow fixed plate, the hollow fixed plate having a protruded lateral plate, a mold support device disposed on a center of the movable plate, the locking device having a first and second parallel locking plates connecting the movable plate, a first, second, third and fourth adjusting devices disposed on a right upper corner, left upper corner, left lower corner, and right lower corner of the fixed plate, each of the support rods having a threaded front section, each of the first, second, third and fourth adjusting devices having a cushion ring and a hollow nut passed through by each of the corresponding threaded front sections, respectively, the hollow nut enclosed by a follower gear which engaging with a driving gear, the follower gear driving the threaded front section to move rearward and forward, a bearing disposed between the hollow nut and an adjusting plate, two positioning bolts fastening the adjusting plate on the hollow fixed plate, a driving device having the driving gear disposed on the hollow fixed plate, a motor connected to the protruded lateral plate by four screws, a shaft bearing disposed in a center of the motor, a driving pinion disposed on the hollow fixed plate, the driving pinion engaged with a follower pinion, a shaft passing through a center of the shaft bearing and connecting an axle of the driving pinion, and an oil motor connecting the shaft, each of the first, second, third and fourth clamping devices having a first clamp half nut and a second clamp half nut facing the first clamp half nut, a left and right lateral positioning seats disposed adjacent to the corresponding clamp half nuts, respectively, an upper slide rod passing through the left lateral positioning seat, an upper left block, an upper right block, and the right lateral positioning seat, a lower slide rod passing through the left lateral positioning seat, a lower left block, a lower right block, and, the right lateral positioning seat, a bottom bolt connecting a rear end of the corresponding support rod, an inserting block disposed on the bottom bolt abutting a positioning board which extends from the first clamp half nut, a positioning mount disposed on the positioning board, a positioning mounting disposed on the second clamp half nut, a second oil cylinder having a first lid connecting the positioning mounting, a second lid connecting a second cover of the mold support device, a first piston rod disposed in the second oil cylinder, and a piston ring connecting an inner end of the first piston rod, a first oil hole formed on the first lid, the first piston rod passing through the positioning mount and the first lid, the first and fourth clamping devices disposed on an upper and lower ends of the first locking plate, respectively, the second and third clamping devices disposed on an upper and lower ends of the second locking plate, respectively, each of the first and second locking plates passed through by a locking piston rod, each said locking piston rod connecting a locking piston which is inserted in an interior of the movable plate, a hollow disk covering an opening of the interior of the movable plate, a second oil hole formed in the hollow disk, a hollow cushion abutting the hollow disk, the mold support device having a third oil cylinder which has the second cover, the first cover, an annular ring disposed in the third oil cylinder, a bottom plate abutting the first cover, and a second piston rod connecting the annular ring and passing through the first cover and the bottom plate to connect a pivot of the mold, the mold support plate and the bottom plate connected by a plurality of slide plates, a bush disposed between the mold support plate and the slide plates, an enlarged hole formed in the movable plate to receive the mold support plate, wherein each oil motor is actuated to drive each said corresponding shaft and each said corresponding driving pinion to rotate, each said corresponding driving pinions drives each said corresponding driving gear to rotate, each said corresponding driving gear drives each said corresponding follower gear and each said corresponding hollow nut to rotate and to move each said corresponding support rod rearward and forward.

* * * * *